(12) United States Patent
Dandapani et al.

(10) Patent No.: US 12,155,497 B2
(45) Date of Patent: Nov. 26, 2024

(54) LIVE-CUSTOM RECORDING

(71) Applicant: Zoho Corporation Private Limited, Chengalpattu Taluk (IN)

(72) Inventors: Rajendran Dandapani, Chennai (IN); Adithya Shivananda Raja, Chennai (IN); Priyadharshini Balasubramanian, Cuddalore (IN); Priyanka Sudhakara, Chennai (IN); Sudheer A. Grandhi, Pleasanton, CA (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 17/397,958

(22) Filed: Aug. 9, 2021

(65) Prior Publication Data

US 2022/0078038 A1    Mar. 10, 2022

Related U.S. Application Data

(60) Provisional application No. 63/092,394, filed on Oct. 15, 2020.

(30) Foreign Application Priority Data

Sep. 8, 2020    (IN) .............................. 202041038659

(51) Int. Cl.
    *H04L 12/18*    (2006.01)
(52) U.S. Cl.
    CPC ...... *H04L 12/1831* (2013.01); *H04L 12/1818* (2013.01); *H04L 12/1827* (2013.01)

(58) Field of Classification Search
    CPC ............. H04L 12/1831; H04L 12/1818; H04L 12/1827
    See application file for complete search history.

(56) References Cited

U.S. PATENT DOCUMENTS

| | | | |
|---|---|---|---|
| 10,768,885 B1* | 9/2020 | Fieldman | H04L 65/403 |
| 2012/0027012 A1* | 2/2012 | Kudo | H04L 65/4053 370/389 |
| 2013/0027508 A1* | 1/2013 | Charish | H04M 3/56 348/14.08 |
| 2013/0198288 A1* | 8/2013 | Jones | H04M 3/42221 709/204 |
| 2015/0215582 A1* | 7/2015 | Leske | H04N 7/152 348/14.09 |
| 2015/0264310 A1* | 9/2015 | Krishnaswamy | H04L 65/80 348/14.12 |

(Continued)

*Primary Examiner* — Raqiul A Choudhury
(74) *Attorney, Agent, or Firm* — Ahmann Kloke LLP

(57) ABSTRACT

Live-custom recording functionality is described. Live-custom recording can help a teleconferencing participant overcome situations where the participant may, for example, not have been attentive and therefore may have missed what was communicated. Another example of a situation that can be overcome with techniques described in this paper is one in which the participant cannot hear the speaker due to inadequate or low bandwidth and network connectivity issues. An enhanced conference recording functionality such as the live-custom recording functionality proposed and described herein is designed to capture applicable segments or clips of the teleconference meeting.

26 Claims, 14 Drawing Sheets

(56) References Cited

U.S. PATENT DOCUMENTS

| | | | |
|---|---|---|---|
| 2016/0065625 A1* | 3/2016 | Ouyang | H04L 65/4038 |
| | | | 715/753 |
| 2017/0064254 A1* | 3/2017 | Mueller | H04L 12/1831 |
| 2018/0083978 A1* | 3/2018 | Pantazelos | H04W 12/06 |
| 2018/0167436 A1* | 6/2018 | Han | H04L 43/0888 |
| 2018/0232129 A1* | 8/2018 | Quinn | G06V 10/464 |
| 2019/0034528 A1* | 1/2019 | Lintz | G06F 16/745 |
| 2020/0412561 A1* | 12/2020 | DeLuca | H04L 12/1818 |

\* cited by examiner

LIVE-CUSTOM RECORDING

CROSS-REFERENCE TO RELATED APPLICATIONS

The present application claims priority to U.S. Provisional Patent Application No. 63/092,394 filed Oct. 15, 2020, and Indian Provisional Patent Application No. 202041038659 filed Sep. 8, 2020, both of which are hereby incorporated by reference herein.

BACKGROUND

Video conferencing is a meeting with two or more participants who are participating in different locations. Typically, a computer connection, audio, and video are used to connect. At its simplest, video conferencing provides the transmission of static images and text between two locations. At its most sophisticated, it provides transmission of full-motion video images and high-quality audio between multiple locations. There are several different types of video conferencing systems including Telepresence Video Conferencing (multiple screens or monitors are used to make everyone feel like they are joining the meeting in-person), Desktop Video Conferencing (the conferencing hardware and software is built-in to a computer or laptop), and Room-Based Video Conferencing (video conferencing technology is built-in to the room itself).

Video conferencing technology is used for team Meetings, collaborative work, webinars, product demos, one-on-one training and support, job Interviews, and for other purposes. An advantage of video conferencing is to record calls and get them transcribed. Anyone can join, regardless of their location with no need to relocate. The teleconferencing can include additional meeting data and insights and enable a digital workforce.

SUMMARY

Video recordings in a video conference can be done using video conferencing apps, where video recording functionality is provided, or using third-party online screen recorders to record video conferences. These recorded video clips or segments may be stored locally in computers or in clouds and archived when necessary. Existing video recording functionality is limited in the flexibility and control provided to the participant. Moreover, it is demanding of memory and storage, which can be a significant problem for some client devices such as handheld wireless devices. So, an enhanced conference recording functionality, as described herein, is desired to address these issues.

DETAILED DESCRIPTION

Figure 1:
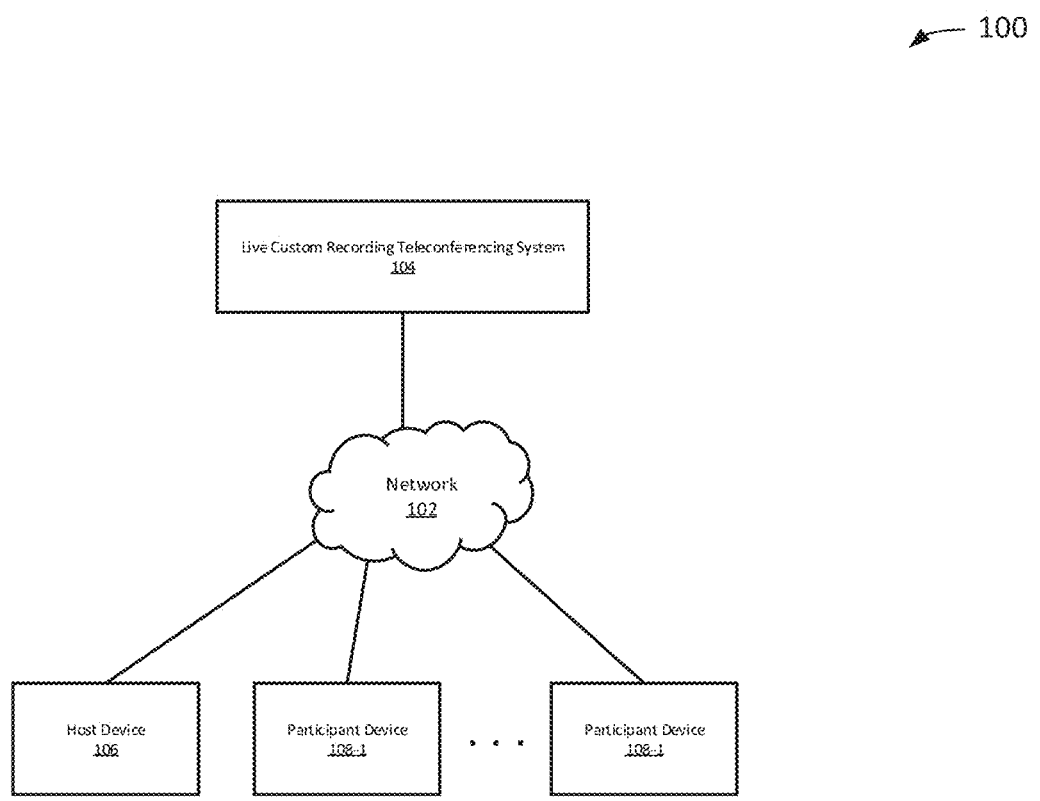
FIG. 1 depicts a diagram of a live-custom recording teleconferencing system.

FIG. 1 depicts a diagram 100 of a live-custom recording teleconferencing system. The diagram 100 is intended to represent a teleconferencing environment in which live-custom recording is available. The diagram includes a network 102, a live-custom recording teleconferencing system 104, a host device 106, and a participant device 108-1 to a participant device 108-n (individually, the participant device 108; collectively, the participant devices 108).

The network 102 is intended to represent a network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. As used in this paper, a means for computing, initiating, or stopping (in a computer system context) includes a processor of some kind, and is intended to include a hardware processor executing instructions, if applicable.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, erasable programmable read-only memory (EPROM), or electrically erasable programmable read only, memory (EEPROM), a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer system location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer system location." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an integrated services digital network (ISDN) modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system. As used in this paper, a means for sending, requesting, providing, or receiving includes an interface of some kind (potentially including a user interface).

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer system for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

The network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A LAN is a private network that connects devices within a limited area like a residence, an office, a building or a campus. A wired LAN uses Ethernet cables to connect computers together directly or more commonly, through a hub, switch, or router. Wireless networks use radio waves to connect devices such as laptops to the Internet and other hand held devices.

The live-custom recording teleconferencing system 104 (which can also be referred to as a live-custom recording teleconferencing engine) is intended to represent a teleconferencing system that enables live-custom recording in a teleconference. The live-custom recording teleconferencing system 104 can be implemented in a cloud. Instead or in addition, components of the live-custom recording teleconferencing system 104 can be implemented on the host device 106, the participant devices 108, or other devices (not shown). In an implementation in which the host device 106 and/or the participant devices 108 are client devices, the live-custom recording teleconferencing system includes a teleconferencing server that comprises one or more entities, such as servers, that provide various functionalities for teleconferencing such as transcoding, mixing, switching etc. A conference management engine in the teleconferencing sever system provides functionalities including but not limited to resource allocation, management of participants (e.g. joining and exiting), conference session management and media stream management, and processing for the server-side teleconferencing operation and functionality. The media streams handled by the conference management engine may be, e.g., voice and video streams using RTP and RIP Control Protocol (RTCP). The live-custom recording teleconferencing system 104 may support MCU and/or SFU functionalities dynamically as needed. Several configurations are possible depending on functionalities desired for a teleconferencing environment.

Video conferencing protocols may be broadly classified into H.323 and SIP. Designed by ITU (International Telecommunication Union) and widely used in IP based videoconferencing, VoIP, and Internet telephony, H.323 provides standards for equipment, computers, and services for multimedia communication across packet based networks and specifies transmission protocols for real-time video, audio and data details. Designed by IETF (Internet Engineering Task Force), SIP (Session Initiation Protocol) is a signaling protocol used to create, modify, and terminate a multimedia session over the Internet Protocol. SIP takes the help of SDP (Session Description Protocol) which describes a session and RTP (Real Time Transport Protocol) used for delivering voice and video over IP networks.

Network Address Translation (NAT) is a process in which one or more local IP address is translated into one or more Global IP address and vice versa in order to provide Internet access to the local hosts. A firewall is a network security device that monitors incoming and outgoing network traffic and permits or blocks data packets based on a set of security rules. A proxy server is a computer that acts as a gateway between a client and a larger-scale network such as the internet. Proxy servers provide increased performance and security.

In mesh topology (P2P), the audio/video streams are passed from one user to another user of the same level. The data is passed directly from one user to another user without any intermediate support like the server. Peer-to-Peer topology is easy to use and implement. When the number of participants increases, the quality of the video is degraded and leads to frozen video and cut-offs in sound.

MCU (Multipoint Control Unit) acts as a gateway in a multipoint videoconferencing system. Each user sends the audio/video streams to the MCU. The MCU does the encoding and decoding. It then combines all the streams into one stream and distributes it to the users. There is one outgoing stream from the user to MCU and one incoming stream from the MCU to the user. MCU supports different users with different devices. It supports protocols such as S.I.P and H.323. It normalizes the audio/video streams from the user. It also filters noise and reduces echo in audio streams. The centralized encoding and decoding at the MCU helps in reducing the bandwidth and computational load on the user side.

In SFU video conferencing architecture, the audio/video streams from the user are passed to the SFU (Selective Forwarding Unit). The SFU collects the stream and selectively forwards it to the users. There is one outgoing stream from the user to SFU and one or more incoming streams from the SFU to the user.

SVC (Scalable Video Coding) is a video compression technique that requires less bandwidth for video transmission. An SVC video stream is constructed with a minimum base layer and additional (multiple) enhanced layers. This layering technique requires less bandwidth and has the capacity to recover quickly from error. SVC can support a broad range of devices and networks.

In Simulcast video conference architecture, different independent versions of the same stream with different resolutions are sent simultaneously from a user. The collected stream is encoded and transmitted with different resolutions and frame-rates ranging from minimal quality to highest necessary quality as required for different users.

The host device 106 and the participant devices 108 are intended to represent devices used by the host and participants to host or participate in a teleconferencing session. Such devices can include a phone, laptop, desktop, table, or the like. Hardware typically includes a microphone and speaker, headphones, or earphones for voice input/output and a camera or webcam and display device for video input/output. A modem can be used to convert data from one form to another so that it can be transmitted from one computer to another and a codec can be used to compress and decompress data used in voice over IP (VOW), video conferencing, and streaming media. Video conferencing software enables a host to initiate and conduct live conferences and remote meetings by transmitting audio, video, and text. It often includes features like file sharing, electronic whiteboards, and file transfers. Acoustic Echo Cancellation (AEC) software removes echoes generated by the enclosed loudspeaker from the microphone signal. With web Real Time Communication (webRTC), meetings can be scheduled directly from a browser. Advantages of browser-based video conferencing includes no need to download, store, or update apps; it is easy, to launch; it is compatible with most devices, OS, and browsers; and security is handled by the browser.

In a specific implementation, the host device 106 and the participant devices 108 communicate via a teleconferencing server system e.g. a video conferencing system. The host device 106 and the participant devices 108 can be referred to as "client devices" in an implementation in which they act as clients for a teleconferencing sever system. In such an implementation, a client conference management engine in a client device provides functionalities including but not limited to resource allocation, conference session management and media stream management & processing for client-side teleconferencing operation and functionality. The media streams handled by the client conference management engine may be, e.g., voice and video streams using RTP and RTCP. In some scenarios there may be peer to peer communication and direct conferencing between client devices.

In an example of operation, using a server-client description for illustrative purposes, via the network 102 in coordination with the live-custom recording teleconferencing system 104, a speaker using the host device 106 and an audience using participant devices 108 participate in a teleconference. An audience member may miss what was communicated by the speaker due to inattentiveness, inadequate or low bandwidth and network connectivity issues that result in choppy audio; a video feed that keeps freezing up, screen sharing failure; and extended, unexplained delays, or for other reasons. Low bandwidth or (for the purposes of this example) equivalent performance-reducing causes include concurrent streaming activities, large file transfers, malware, junk software, speed mismatches and other hardware-related issues, network configurations, or the like.

Live-custom recorder functionality is useful to capture segments or clips of the teleconference meeting, especially when an audience member feels they have missed something. More generally it provides flexibility and control to an audience member to capture notes or highlights of the teleconference in the form of live-custom recording segments or clips customized to the audience member's interests. It may be noted that in some teleconferencing sessions, one speaker can be replaced with another speaker (including members of the audience); if applicable, tools for switching speakers are assumed.

In a specific implementation, an audience member clicks a live-custom recorder button during the teleconference to capture a segment of the teleconference, which causes a recording to begin as of some time before the button was clicked (e.g., a few minutes prior to pressing the live-custom recorder button). Later, such as when the audience member feels that the recording is sufficient, the audience member can stop the recording; the recording can also be stopped upon request of receipt to stop recording through an automated process (e.g., after a default duration has been reached, when sufficient-bandwidth conditions are no longer met, etc.). Capturing only a few such live-custom recording segments or clips rather than recording the entire meeting will save conserve computer resources, most obviously storage space. In a specific implementation, live-custom recording functionality is also designed to provide options to record in a range of formats, including those that have lower memory and storage requirements e.g. lower bit rate video, audio only, and speech transcription only (e.g. speech to text captioning) formats. Another useful aspect provided in the design of the live-custom recording functionality is that an audience member can have immediate access to live-custom recording segments or clips. These live-custom recording segments or clips can be played in a separate window that can be private or shared with other participants (e.g. the speaker, a subset of the audience members, or all participants). For private review, the participant may also play the live-custom recording segments using any suitable media player that can play the live-custom recording content.

In a specific implementation, the live-custom recording functionality requires storing a specified maximum window of history of the teleconference continuously, e.g., last 10 min of the teleconference history. The specified maximum window of history can be configured or modified by a teleconference meeting organizer, a server-side administrator in live-custom recording session, or by a client-side participant in live-custom recording session.

In a specific implementation, when a participant triggers live-custom recording, the participant can, if allowed, specify or select a past duration to record via a user interface in any of the following ways: (a) entering a time duration, e.g., 7 minutes; (b) choosing from suggested time duration options e.g. 2, 4, 6, 8, or 10 minutes; or (c) choosing a non-numerical preference designation. A default past duration for live-custom recording may be applied in the absence of a default specification or selection by the participant. The value of this default may be configured or modified similar to the specified maximum window of history. Essentially the participant can set the past duration for live-custom recording which is always bounded or limited by the specified maximum window of history. Alternatively, an administrator can select duration defaults for individuals globally, individually, or based upon characteristics (e.g., the role, requested accommodations, or the like) of a participant. If the specified maximum window of history is updated during the conference, the options of past duration for the live-custom recording presented on the user interface to the participant may need to be updated to stay within the new bound or limit specified by the update. Each of these specifications can occur in real time with immediate implementation of the most recent specification though, depending upon implementation-, configuration-, or preference-specific factors, the window may need time to fill if the newer specification is for a larger window than was previously specified.

In another scenario when a participant triggers a live-custom recording, the participant may be allowed to choose a future duration to record from the time of live-custom recording request and append to the live-custom recording segment or clip. Essentially the duration of the live-custom recording request contains a past duration and a future duration (as measured) from the time of the live-custom recording request. The design and configuration are analogous to that of the past duration to include in a live-custom recording segment. One point of difference is that the participant may chose the future duration to record dynamically by ending (in real-time) the live-custom recording from the user-interface e.g. via a button for ending a live-custom recording in progress. When a participant triggers live-custom recording, the participant may also be allowed to specify or select a future duration to record (in addition to the past duration) via a user interface in any of the following ways: (a) entering a time duration e.g. 5 minutes (b) choosing from suggested time duration options e.g. 1, 3, 5 minutes. A default future duration for live-custom recording may be applied in the absence of a specification or selection by the participant. The value of this default may be configured or modified at anytime. Essentially the participant can set the future duration for live-custom recording which is always bounded or limited by the specified maximum future window. The specified maximum future window may be configured or modified at anytime by the teleconference meeting organizer or administrator in a server-side live-custom recording functionality and by a participant in a client-side live-custom recording functionality. If the specified maximum future window is updated at anytime during the conference, the options of future duration for the live-custom recording presented on the user interface to the participant may need to be updated to stay within the new bound or limit specified by the update.

In a specific implementation, a participant can specify via the user-interface, for each live-custom recording request, a type of media format for live-custom recordings such as a video format with a bit rate, an audio only format with bit rate or speech transcription only format (e.g. speech to text captioning). The type of media format may be set in advance and used for all subsequent live-custom recordings until it is updated or changed by the participant.

In a specific implementation, when a live-custom recording is triggered or requested, a live-custom recording initiation message goes to server along with participant identifier, desired live-custom recording format, selected or specified live-custom recording duration, and a live-custom recording sequence number for the live-custom recording request. The live-custom recording sequence number reflects the chronological order of the live-custom recording requests and segments. It may be used to reorder the live-custom recording segments when they are out of order due to different processing times for the live-custom recording requests. The processing times may be impacted by the length of segments, any transcoding requirements, or delays due to computing resources for the processing being distributed. The participant identifier, live-custom recording sequence number, and a time stamp corresponding to the time of live-custom recording request together form a unique identifier (and also serve as meta data) for a live-custom recording segment.

In a specific implementation, a participant can specify via the user-interface, for each live-custom recording request, a tag/name for the live-custom recording segment or clip to help with indexing and search ability e.g. using appropriate keywords. The tag or name may be specified along with the live-custom recording request if the participant wishes. A tag or name for a live-custom recording request from a participant may or may not be specified after the live-custom recording request is sent for processing so as to not delay the processing. The tag or name for a live-custom recording is preferably obtained from the participant (via the user interface) as soon as possible (at the time of the live-custom recording request or after the live-custom recording request is sent for processing) so as not to delay processing; it may be desirable for a server-side engine to provide the tag or name if one is not provided expeditiously. The tag or name is associated with the unique identifier for the live-custom recording segment and may or may not be included as part of the name for the live-custom recorder segment. If the tag or name is to be included as part of the name at the time of providing access to a completed live-custom recording, it should be obtained before the completion of the processing for live-custom recording.

Figure 2:
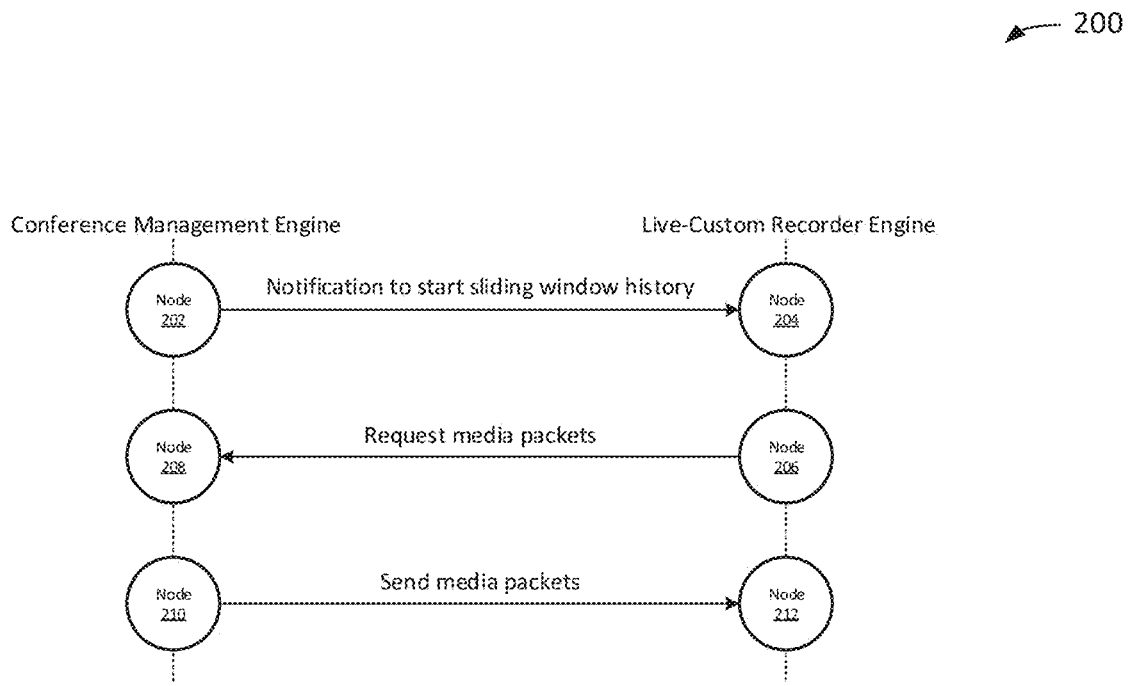
FIG. 2 depicts a server-side flow diagram for maintaining sliding history window.

FIG. 2 depicts a server-side flow diagram 200 for maintaining sliding history window. The diagram includes nodes 202, 208, and 210 of a conference management engine and nodes 204, 206, and 212 of a live-custom recorder engine. In a specific implementation, the conference management engine and live-custom recorder engine are implemented as part of the live-custom recording teleconferencing system 104 of FIG. 1. In order to support live-custom recording functionality the live-custom recorder engine stores and maintains a specified maximum window of history. This is a sliding window and data older than or outside this window is discarded. The window can be specified by the teleconference organizer or administrator as a maximum history window for live-custom recording. The live-custom recorder engine stores and maintains data from media streams corresponding to participants of a teleconference for a specified sliding window dynamically. Live-custom recordings may be stored, for example in RTP & RTCP format or transcoded to a convenient/suitable format based on the capabilities of devices used by the participants. For illustrative purposes, storage of live-custom recording segments/clips using RIP & RTCP format as described here, with the understanding storage for live-custom recording segments can be in any desired media type and format. The media content in RTP & RTCP format can be transcoded to another media type and format e.g. MPEG video, if desired.

The diagram 200 is intended to illustrate shows message flow between a conference management engine and a five-custom recorder engine. The conference management engine notifies the live-custom recorder engine to start a sliding window history (represented by the arrow from the node 202 to the node 204). In one scenario this notification message may be received when the teleconference begins e.g. when a teleconference is started by the organizer. In another scenario this notification message may be received when a participant joins the teleconference. In yet another scenario this notification message may be received when a participant opts for live-custom recording either by activating a corresponding command on the user interface or by responding to a recording preference/poll message (e.g. from the conference management engine).

When maintenance of the sliding window history begins, the live-custom recorder engine requests packets from the conference management engine (represented by the arrow from the node 206 to the node 208). Start time is computed by subtracting past duration (d) from current time (c). For example, for c=12:23 PM and d=5 minutes, start time would be 12:18 PM. Depending upon configuration-, implementation-, or preference-specific factors, the start time can have a different granularity than minutes (e.g., to the second).

The conference management engine sends packets to the live-custom recorder engine (represented by the arrow from the node 210 to the node 212). The live-custom recorder engine then maintains a sliding history window for a duration specified by the teleconference meeting organizer or administrator. Maintenance of the sliding history window may be stopped under various scenarios (e.g. resource constraints or conservation, participant input choice or conference exiting) on receiving by the live-custom recorder engine (e.g. from the conference management engine) a notification message for stopping the sliding window history maintenance.

Figure 3:
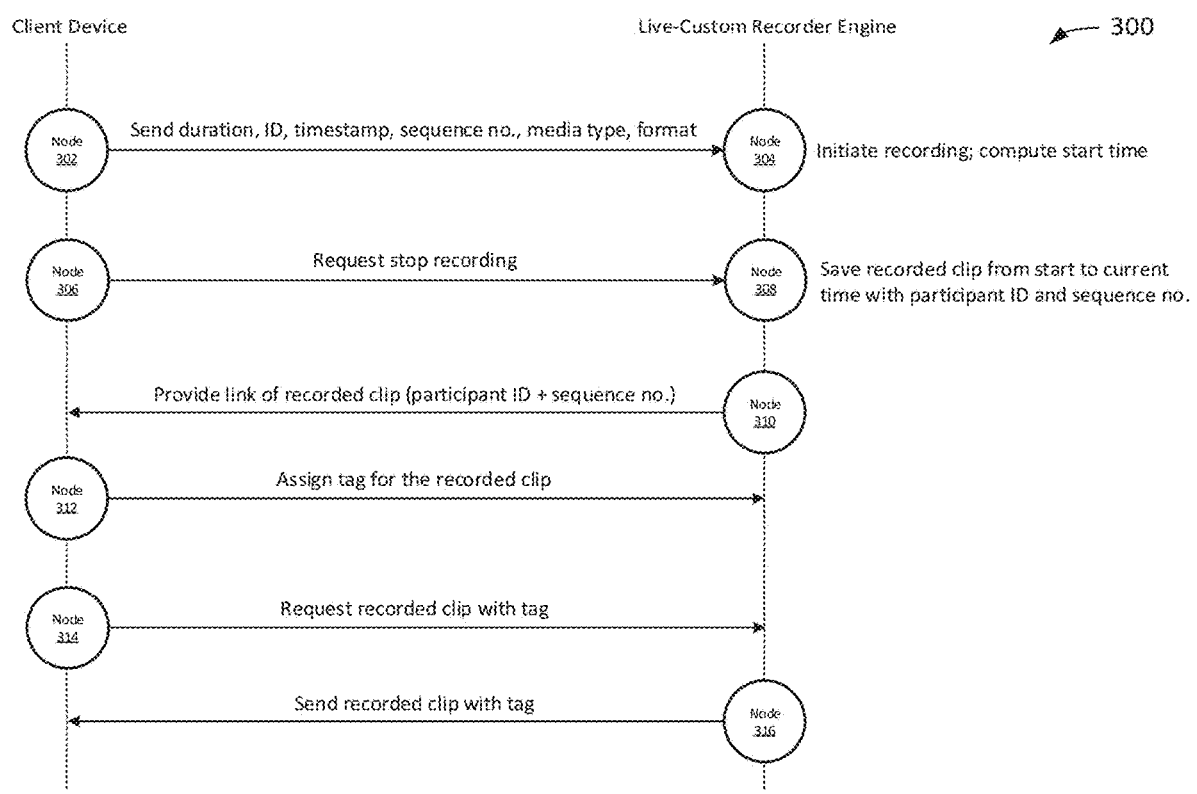
FIG. 3 depicts a server-side flow diagram for live-custom recording.

FIG. 3 depicts a server-side flow diagram 300 for live-custom recording. The diagram 300 includes nodes 302, 306, 312, and 314 of a client device and nodes 304, 308, 310, and 316 of a live-custom recorder engine. The diagram 300 is intended to illustrate a message flow between a client device and a live-custom recorder engine. When a live-custom recording is initiated/triggered (from the user interface of a participant) with a specified duration, a live-custom recording request message is sent from the client device to a teleconferencing server that includes the live-custom recorder engine.

In a specific implementation, when a participant, triggers a start recording, a message containing participant identifier, timestamp, a live-custom recording sequence number, media type preference (e.g., multimedia, audio only, or speech transcription), and format preference is sent from the client device to the live-custom recorder engine (represented by the arrow from the node 302 to the node 304). The message may include a past duration or the past duration can be determined on the server side. The live-custom recorder engine computes the starting time for live-custom recording based on the past duration for live-custom recording (e.g., time of live-custom recording request minus a specified past duration for live-custom recording) and starts recording in association with the participant identifier.

The live-custom recorder engine stores relevant stream packets from the live-custom recording start time by copying from the available live-custom recorder history and applies any, transcoding if necessary (e.g. for a media format, bit rate etc.). When the participant requests stop recording (represented by the arrow from the node 306 to the node 308), the live-custom recorder engine stores the recorded media clip with participant identity and sequence number (which can also include timestamp and tag, if specified). The live-custom recorder engine provides a link of the recorded clip to the client device (represented by the arrow from the node 310).

The participant assigns a tag for the recorded clip (represented by the arrow from the node 312). Alternatively, the tag could be included in the message from the node 302 or assigned at the server side. In this sense, the flow from the node 312 is optional. If applicable, the participant requests the recorded clip with the tag (represented by the arrow from the node 314). Instead or in addition, the participant can request the recorded clip using some other identification of the clip. The live-custom recorder engine then sends the recorded clip with the tag (represented by the arrow from the node 316).

Advantageously, the live-custom recorder engine makes the live-custom recording segment or clip identified with a name (e.g. including participant identifier, time-stamp, a sequence number, a tag name if specified) immediately available or accessible to the participant. This access may be provided via a user interface on the client device or on some other device. In some embodiments one or more messages between the client device and live-custom recorder engine are communicated via some other engine e.g. a conference management engine.

Sharing permissions of a live-custom recording on the server-side can be specified by the participant for each live-custom recording clip. By default a live-custom recording is private in the absence of any permission setting by the participant. However participant can modify permission setting for a live-custom recording by adding and removing permissions for other participants.

In one scenario the server may only store the active speaker's media streams. The selection of the active speaker's media streams may be based on voice activity detection. This would reduce the storage size requirement which is especially useful in client devices with limited memory/storage.

Figure 4:
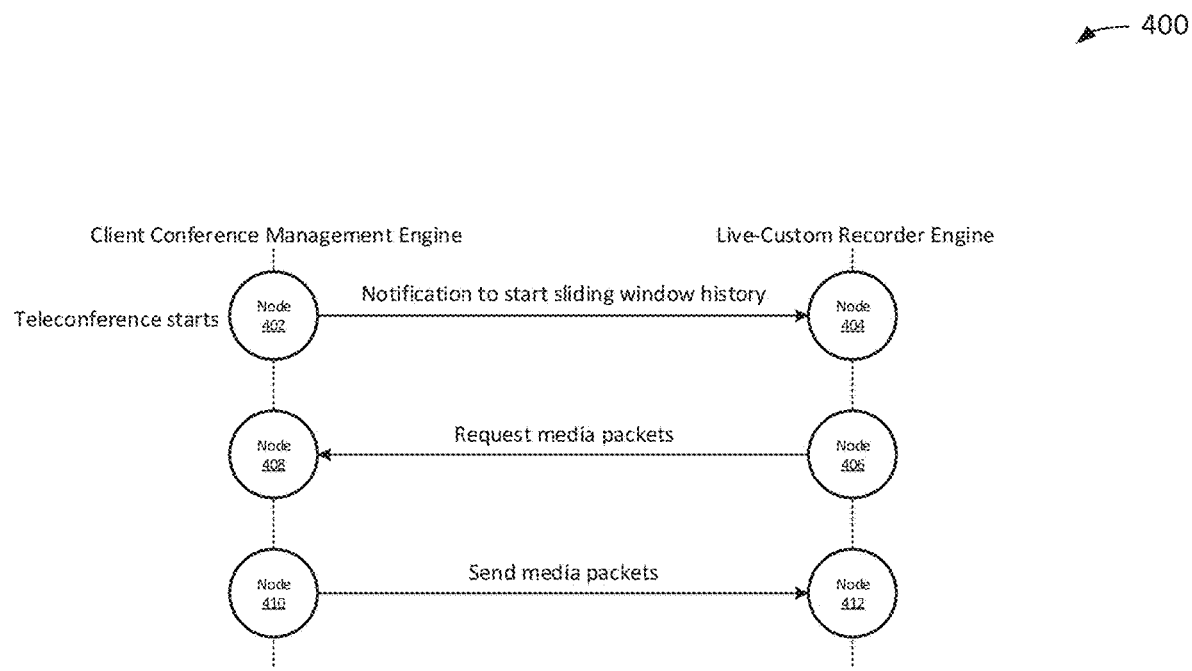
FIG. 4 depicts a client-side flow diagram for maintaining sliding history window.

FIG. 4 depicts a client-side flow diagram for maintaining sliding history window. The diagram includes nodes 402, 408, and 410 of a conference management engine and nodes 404, 406, and 412 of a live-custom recorder engine.

As teleconferencing starts, the live-custom recorder engine requests media packets from client conference management engine. Sliding history window is maintained by the live-custom recorder engine for a duration specified by the teleconference meeting organizer or administrator. When a teleconference starts, the client conference management engine sends notification to start sliding window history to the live-custom recorder engine (represented by the arrow from node 402 to the node 404).

The live-custom recorder engine requests media packets from the client conference management engine (represented by the arrow from node 406 to the node 408). With client-side recording, recorded data is stored on the client device. All the recordings done by the live-custom recording functionality has a past duration which cannot be beyond or older than a specified maximum window of history. The specified maximum window of history may be configured or modified anytime. It is also a sliding window and data older than or outside this window is discarded. The teleconference organizer or administrator specifies this maximum history window for live-custom recording. The live-custom recorder engine maintains and stores the media streams corresponding to the participants of the teleconference for the specified sliding window dynamically.

The client conference management engine sends the media packets to the live-custom recorder engine (represented by the arrow from the node 410 to the node 412) as requested.

Figure 5:
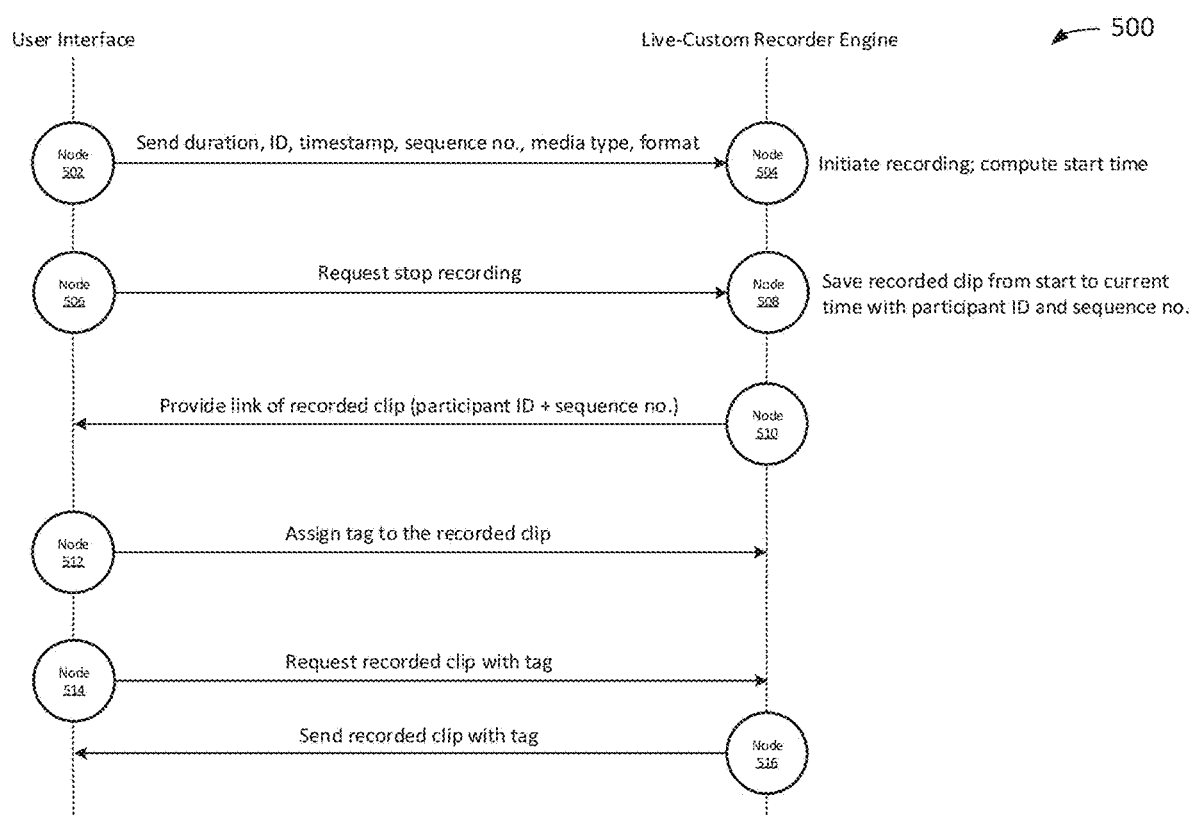
FIG. 5 depicts a client-side flow diagram for live-custom recording.

FIG. 5 depicts a client-side flow diagram for live-custom recording. A participant triggers a live-custom recording from a user interface by sending a live-custom recording request message is sent to the client live-custom recorder engine located in the client device. The live-custom recording request message is sent including information such as duration, participant identifier, timestamp, a live-custom recording sequence number, a tag/name if specified, and a preference for media type and format e.g. video, audio only or speech transcription along with relevant format (represented by the arrow from the node 502 to the node 504). The client's live-custom recorder engine initiates recording with the given tag/identifier for the participant. It computes the start time for live-custom recording based on past duration for live-custom recording (which can also be provided in the message or generated by the live-custom recorder engine) and stores the relevant media stream packets from the live-custom recording start time by copying from the available live-custom recorder history. As a default the live-custom recorder engine stores the recorded media clip with participant identity and sequence number. If necessary transcoding is also applied (e.g. for a media format, bit rate etc.).

When the participant indicates a desire to stop a live-custom recording in the user interface, a request to stop recording is sent to the client engine (represented by the arrow from the node 506 to the node 508). The live-custom recorder engine stops storing information for the live-custom recording segment or clip and makes the live-custom recording segment or clip identified with a name (e.g. including participant identifier, time-stamp, a sequence number, a tag name if specified) immediately made available or accessible to the participant.

The live-custom recorder engine provides a link (e.g., in the user interface) of the recorded clip to the participant (represented by the arrow from the node 510).

The participant can assign a tag to the recorded clip (represented by the arrow from the node 512). So later, if the participant wants to access the clip, the participant can request the live-custom recorder engine for the recorded clip using the assigned tag (represented by the arrow from the node 514). The live-custom recorder engine provides the recorded clip with tag in response to the request (represented by the arrow from the node 516). In some embodiments one or more messages between the user interface and live-custom recorder engine may be communicated through an other module or engine e.g. the client conference management engine.

In client side processing, permission for sharing the live-custom recording can be specified by the participant for each live-custom recording clip. By default a live-custom recording is private in the absence of any permission setting by the participant. However participant can modify permission setting for a live-custom recording by adding and removing permissions for other participants.

In one scenario the client may only record and store the active speaker's media streams. In that case the selection of the active speaker's media streams may be based on voice activity detection. This would reduce the storage size requirement for client devices in user interface with limited memory/storage. For example, the feed of a first participant (e.g., a speaker) can be stored in a higher quality format (e.g., multimedia) while the feed of a second participant (e.g., an audience member with a question) can be stored in a lower quality format (e.g., a transcription). Participants who are relegated to transcription can be ascribed the transcription by putting their transcribed feed into chat, on an image representing the participant, or the like. In another scenario if the client side is experiencing bandwidth issues (low/no bandwidth) then the system automatically triggers to change the recording process to the server side.

A live-custom recorder engine providing one or more of the live-custom recording functionalities described herein may be implemented on one or more client devices in the teleconference system. A notification message is received (e.g. from a client conference management engine located in the client device) by the live-custom recorder engine to start a sliding history window and its maintenance. In one scenario this notification message may be received when the teleconference begins e.g. when a teleconference is started by the organizer. In another scenario this notification message may be received when the participant associated with the client device joins the teleconference. In yet another scenario this notification message may be received when the participant associated with the client device opts for live-custom recording either by activating a corresponding command on the user interface or by responding to a recording preference/poll message (e.g. from the conference management engine). The maintenance of the sliding history window may be stopped under various scenarios (e.g. resource constraints or conservation, participant input choice or conference exiting) on receiving by the live-custom recorder engine (e.g. from the client conference management engine) a notification message for stopping the sliding window history maintenance.

Figure 6:
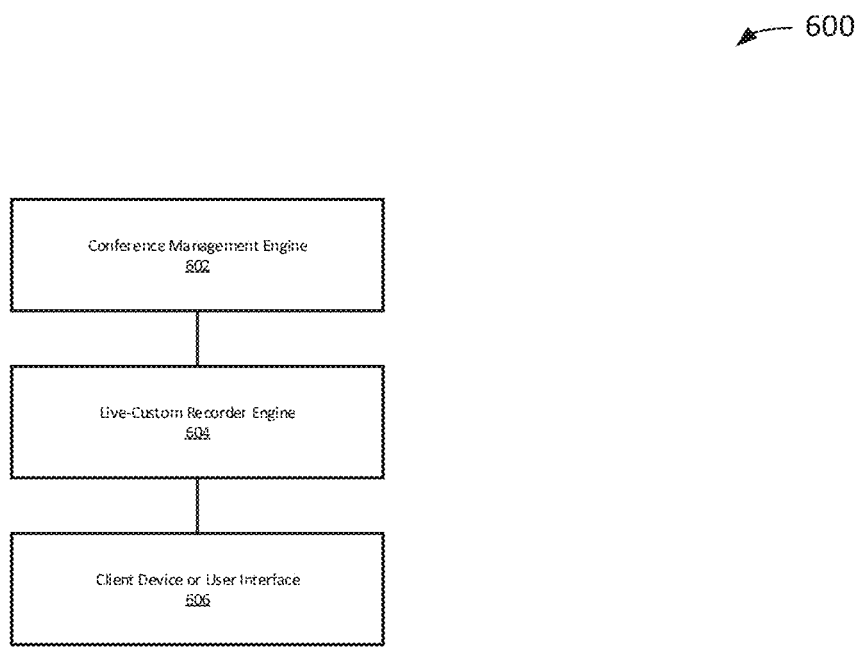
FIG. 6 depicts a diagram of engines of a live-custom recording teleconferencing system.

FIG. 6 depicts a diagram 600 of engines of a live-custom recording teleconferencing system. The diagram 600 includes a conference management engine 602, a live-custom recorder engine 604, and a client device or user interface 606. The conference management engine 602 can be implemented server-side, client-side, or on an end user device. The live-custom recorder engine can be implemented server-side, client-side; or on an end user device. In an implementation in which the conference management engine 602 is implemented server-side, the client device or user interface 606 is implemented client-side. In an implementation in which the live-custom recorder engine is implemented server-side, the client device or user interface 606 is implemented client-side.

In operation, the conference management engine 602 sends a notification to start sliding window history to the live-custom recorder engine 604, as described previously; receives a request for media packets from the live-custom recorder engine 604, as described previously; and sends media packets to the live-custom recorder engine 604 in response thereto, as described previously. Conversely, the live-custom recorder engine 604 receives a notification to start a sliding window history from the conference management engine 602, as described previously; requests media packets from the conference management engine 602, as described previously; and receives media packets from the conference management engine 602, as described previously. This behavior is the same regardless of whether one or both of the conference management engine 602 and the live-custom recorder engine 604 are server-side, client-side; or implemented on an end-user device.

In operation, the live-custom recorder engine 604 computes a start time by subtracting past duration from current time, as described previously; initiates a live-custom recording of a teleconference from the start time, as described previously; stops the live-custom recording upon receipt of a request to stop recording, as described previously; provides a link of the live-custom recording to a teleconference participant, as described previously; and sends the live-custom recording to the teleconference participant, as described previously. This behavior is the same regardless of whether the live-custom recorder engine is server-side; client-side, or implemented on an end-user device. However, the client device or user interface 606 is properly characterized as a user interface (and not a client device) if the live-custom recorder engine 604 and the client device or user interface 606 are on the same end-user device.

In one embodiment live-custom recording for a past duration starts when the past duration is received as input (e.g. from a participant). In another embodiment the past duration input mechanism on the user interface has a dedicated start command (e.g. an icon) associated with it, to start the recording for the past duration when activated (e.g. by the participant). The start command (e.g. an icon) may be displayed in a user interface where the past duration for live-custom recording is to be provided as input by the participant.

In one scenario, when a participant triggers live-custom recording functionality consecutively, there may be overlapping of recording. When a participant triggers the start button, the system receives a request to record a past and potentially future duration. The request for recording is within the limit of the maximum size of the history window. In a specific implementation, the participant (or an administrator) fixes the duration of past and future recordings before the recording commences. For the purposes of this example, the system receives another request that overlaps in time with the earlier request. In another scenario, the participant initiates the starting and stopping of the recording by actively clicking the start and stop button wherever necessary, but even in this second scenario there may be an overlap in time between two consecutive live-custom recording requests. Both scenarios result in the same content being recorded twice, but it may be desirable to avoid making the participant listen to the same content again.

Figure 7:
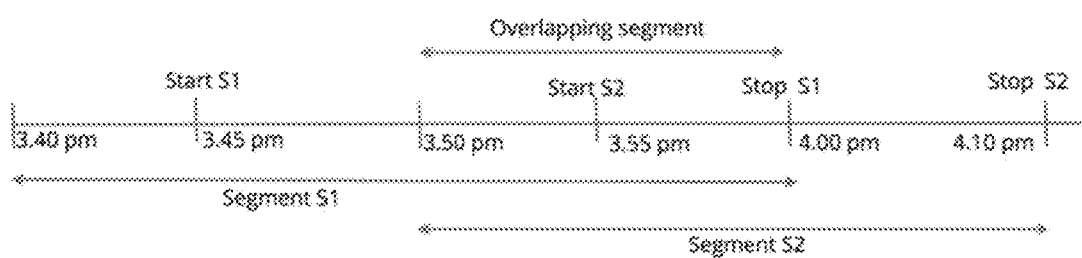
FIG. 7 illustrates an example of overlapping recordings.

FIG. 7 illustrates an example of overlapping recordings. For the purposes of this example, a participant triggers the start recording option at 3:45 pm, wherein the live custom recorder starts a five-minute recording (assuming the past duration assigned by the participant or an admin is five minutes) prior to the actual time and the recording continues until a future duration fixed by the participant or until the participant triggers a stop option through a user interface (here it is 4:00 pm-Segment S1). Before the first request is completed, the participant triggers the start recording option at 3:55 pm and hence the live custom recorder starts recording from 3:50 pm onwards and goes until the future duration assigned by the participant has arrived or the participant triggers the stop option (here it is 4:10 pm—Segment S2). Therefore overlapping of recording takes place between 3:50 pm to 4:00 pm.

When there is a time overlap between two live-custom recording segments one segment or both segments may be trimmed so that the overlapping portion is not included in both segments but included only in one of the segments. This trimming may be done after both the segments have been recorded as a post processing function. In an another scenario the trimming may be done dynamically in real time when a first recording and a consecutive second recording overlap. Here the second recording is trimmed while the first recording is ongoing or completed. Trimming the overlapping time/portion in the second recording may create one or two segments as described in the following scenarios. In one scenario only one segment for the second recording is created when the second recording time/duration extends beyond the first recording in the past or the future. This segment created corresponds to the time/duration of the second recording which extends beyond the first recording. In another scenario two segments for the second recording are created when the second recording time/duration extends beyond the first recording both in the past and the future. These two segments created correspond to the times/duration of the second recording which extend beyond the first recording.

The segments created from the second recording request may be associated or linked with the segment(s) of the first recording in one or more of the following ways: (1) storing the associations/links as metadata for the recordings (2) assigning name tags for the segments indicating the association/link (e.g. SegmentName1, SegmentName2 where "SegmentName" is common in the name tags for two linked/associated segments) (3) on receiving the selection of a segment by a participant presenting/displaying all linked segments to the participant (e.g. on the user interface) (4) indicating/presenting/displaying an association/link between any two segments (e.g. on the user interface) when such an association/link exists (5) the linking/associating functionality providing and indicating the time sequence information for the linked segments.

Figure 8:
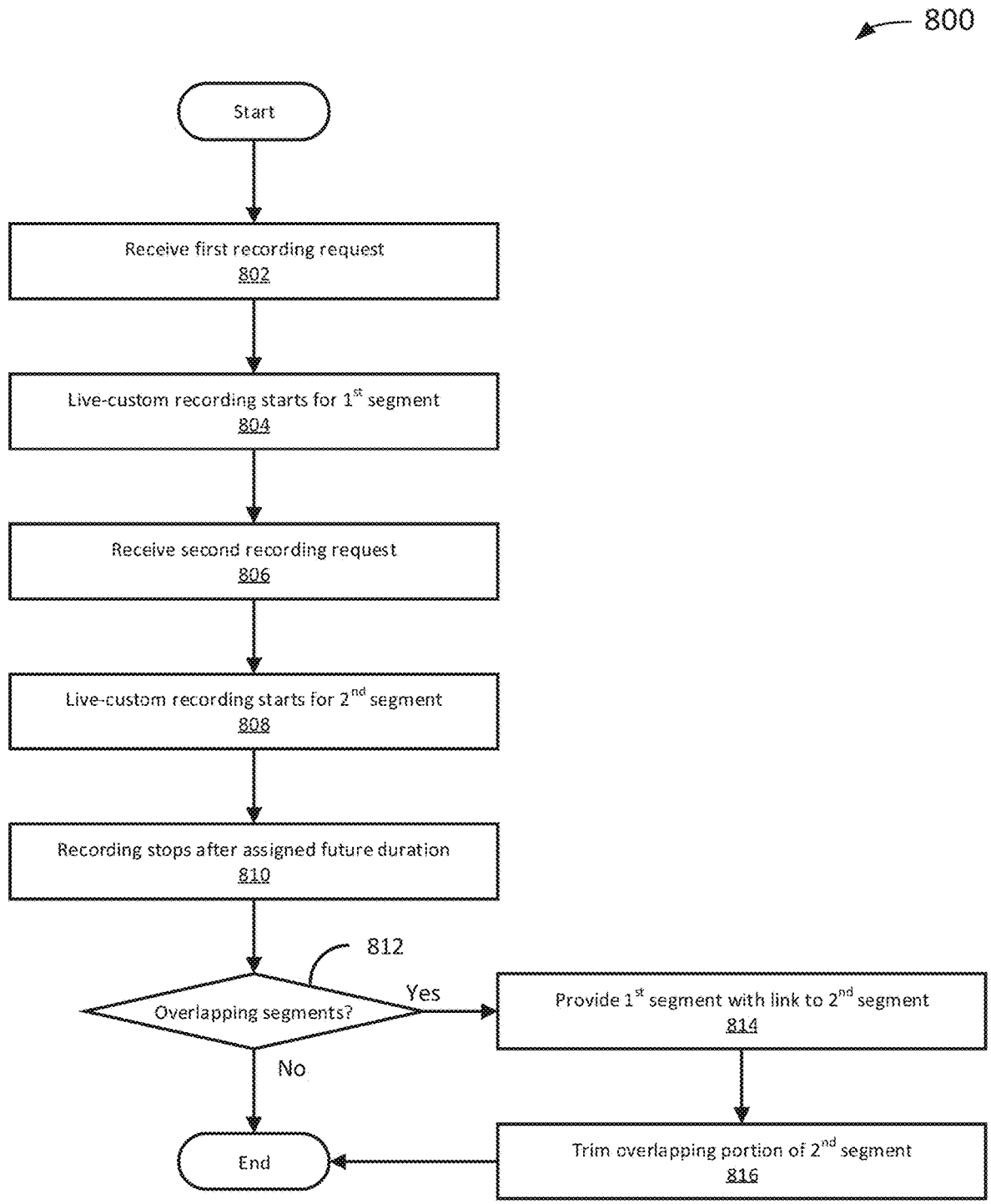
FIG. 8 depicts a flowchart of an example of a method for linking recording segments.

FIG. 8 depicts a flowchart 800 of an example of a method for linking recording segments. The example of FIG. 8 is intended to illustrate a situation during which overlapping recordings occur. The flowchart 800 starts at module 802 with receiving a first recording request. At module 804, live-custom recording starts for a first segment in response to the first recording request. For the purpose of this example, before recording of the first segment is completed, a second recording request is received at module 806 and at module 808 live-custom recording starts for a second segment in response to the second recording request. At module 810, recording stops after an assigned future duration is reached. The future duration can be assigned by a participant or an administrator. At decision point 812, it is determined whether there are overlapping segments. If not (812-No) then the flowchart 800 ends and the segments are handled separately. If so (812-Yes), then the flowchart 800 continues to module 814 with providing the first segment and a link to the second segment to a participant and then to module 816 with trimming the overlapping portion of the second segment. In this way, overlapping content present in both segments, is removed from the second segment. Alternatively, after trimming the overlapped content from the second segment, a participant can provided with a recording of the first segment along with the contextual link to the second segment (essentially switching the order of modules 814 and 816). Alternatively, after removing the overlapped content from one of the segments, the size of the two recording segments put together is compared with the maximum recording window size. If it is less than the maximum recording window size, the two segments are merged into one segment (e.g. by concatenating or appending the second segment to the first segment) and given to the participant, eke the participant is provided with two separate recording segments as shown in FIG. 9.

Figure 9:
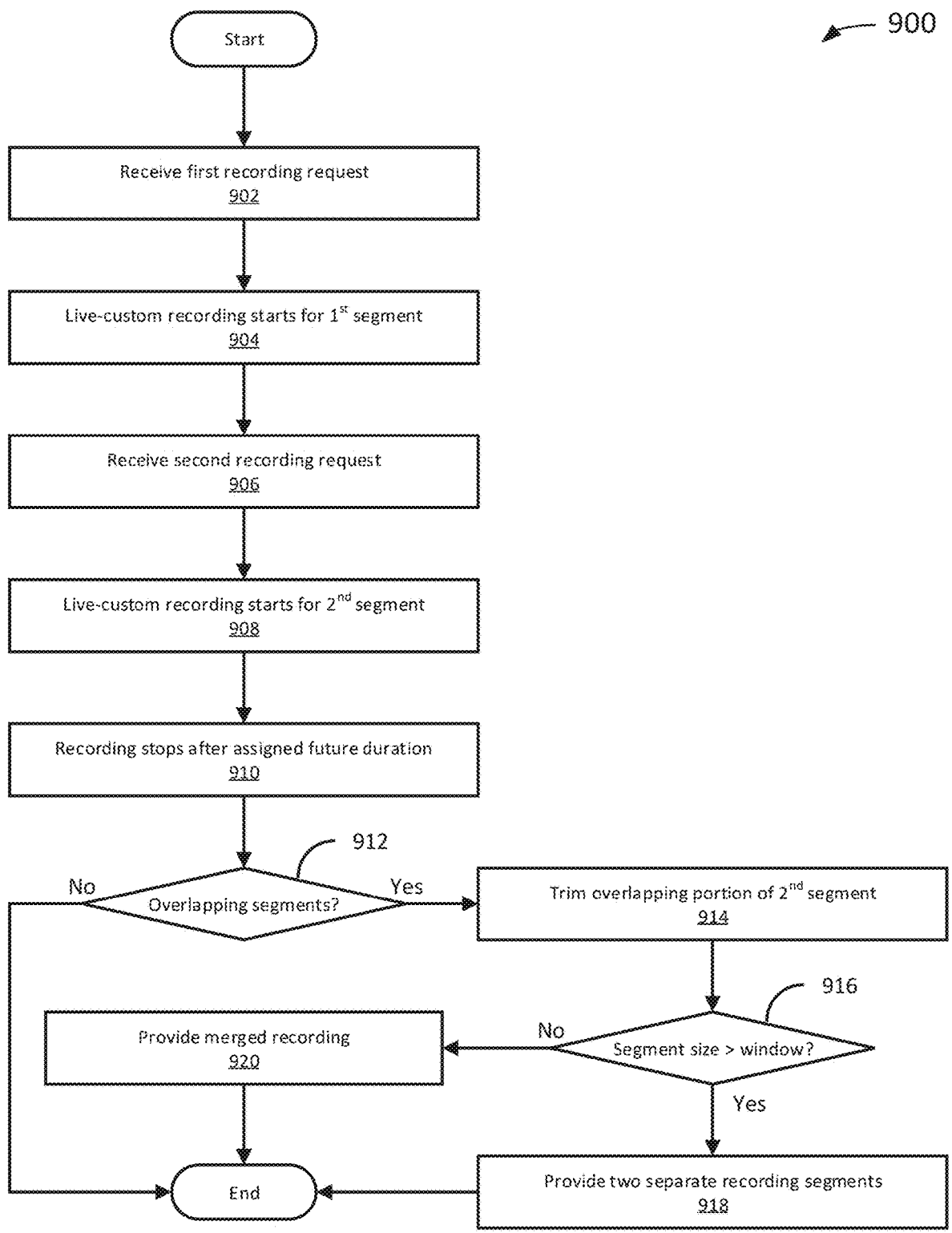
FIG. 9 depicts a flowchart of an example of a method for providing two separate recording segments.

FIG. 9 depicts a flowchart 900 of an example of a method for providing two separate recording segments. The flowchart 900 starts at module 902 with receiving a first recording request. At module 904, live-custom recording starts for a first segment in response to the first recording request. For the purpose of this example, before recording of the first segment is completed, a second recording request is received at module 906 and at module 908 live-custom recording starts for a second segment in response to the second recording request. At module 910, recording stops after an assigned future duration is reached. At decision point 912, it is determined whether there are overlapping segments. If not (912-No) then the flowchart 900 ends and the segments are handled separately. If so (912-Yes), then the flowchart 900 continues to module 914 with trimming an overlapping portion of the second segment and to decision point 916 where it is determined whether segment size>maximum recording window size. If so (916-Yes), the flowchart 900 ends with providing two separate recording segments at module 918. If not (916-No), the flowchart 900 ends with providing a merged recording segment at module 920.

In another embodiment, the system receives a first recording request and a live-custom recording starts. Before the first recording ends, the system receives a second recording request. In such a scenario, the system gives, in this example, a visual indication to the participant that the recording from first request is still happening. For the second recording request the system may prompt the participant to select either "continue recording" or "quit recording". If the participant selects "continue recording" the second recording takes place, which may result in overlapping of recording.

Figure 10:
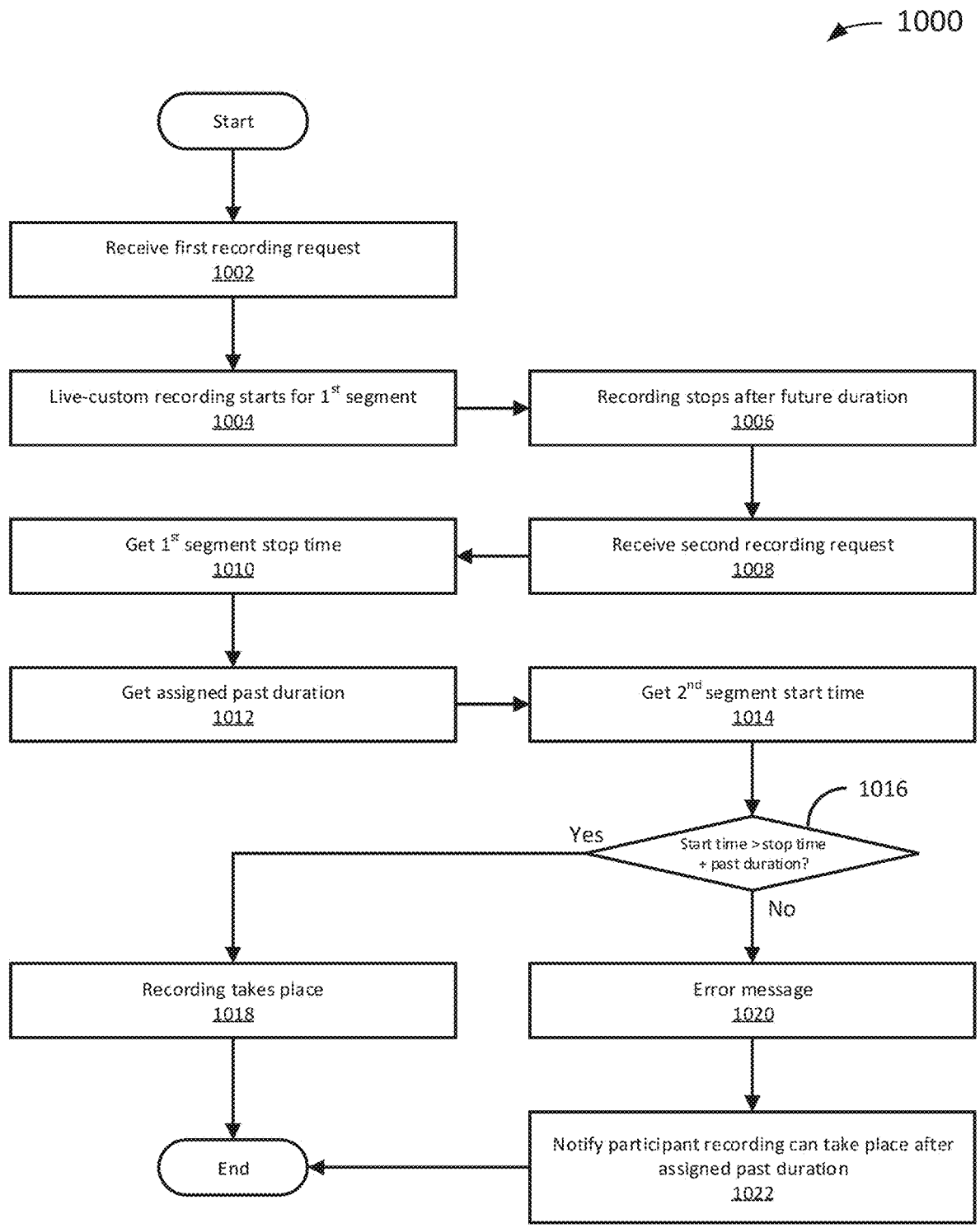
FIG. 10 depicts a flowchart of an example of a preventive method for overlapping of recording.

FIG. 10 depicts a flowchart 1000 of an example of a preventive method for overlapping of recording. In the example of FIG. 10, the flowchart 1000 starts at module 1002 with receiving a first recording request and at module 1004 live-custom recording starts for a first segment in response to receiving the first recording request. For illustrative purposes, a recording stops after future duration at module 1006 and a second recording request is received at module 1008. In this example, the recording stops after a future duration of recording specified by the participant and, later, the system receives a second request for recording. In response to the request, the system gets a first segment stop time at module 1010, gets an assigned past duration at module 1012, and gets a second segment start time at module 1014 (where the second segment corresponds to the second recording request). In other words, before the second recording begins, the system obtains the time the previous recording was stopped ($t_s$), the past duration already fixed by the participant or an administrator ($t_p$), and the starting time of the next recording ($t_r$). The flowchart 1000 continues to decision point 1016 where it is determined whether start time>stop time+past duration. If so (1016-Yes), the flowchart 1000 ends at module 1018 with live-custom recording taking place. The starting time of recording ($t_r$) is expected to be greater than or equal to the time the previous recording was stopped ($t_s$) plus the past duration fixed by an organizer or administrator ($t_p$). If $t_r >= t_s + t_p$ then the recording will take place, as was indicated with reference to module 1018. If it is determined start time is not greater than stop time+ past duration (1016-No), the flowchart continues to module 1020 where a live-custom recording engine generates an error message for the participant and ends at module 1022 with notifying the participant recording can take place after the assigned past duration. (In the meantime, the recording will not happen as there might be overlapping of recording.) For instance if $t_s$=3:55 pm and $t_p$=0.05 minutes, recording will happen only if $t_r$ is >=4:00 pm. The error message will also notify that the participant can initiate recording few minutes later depending on the past duration ($t_p$) fixed by the organizer or the administrator. By this way of notification, the participant will not miss any recordings, either by triggering the record button at the appropriate time or, if available in the implementation, setting a timer to automatically trigger the record button at the appropriate time.

Figure 11:
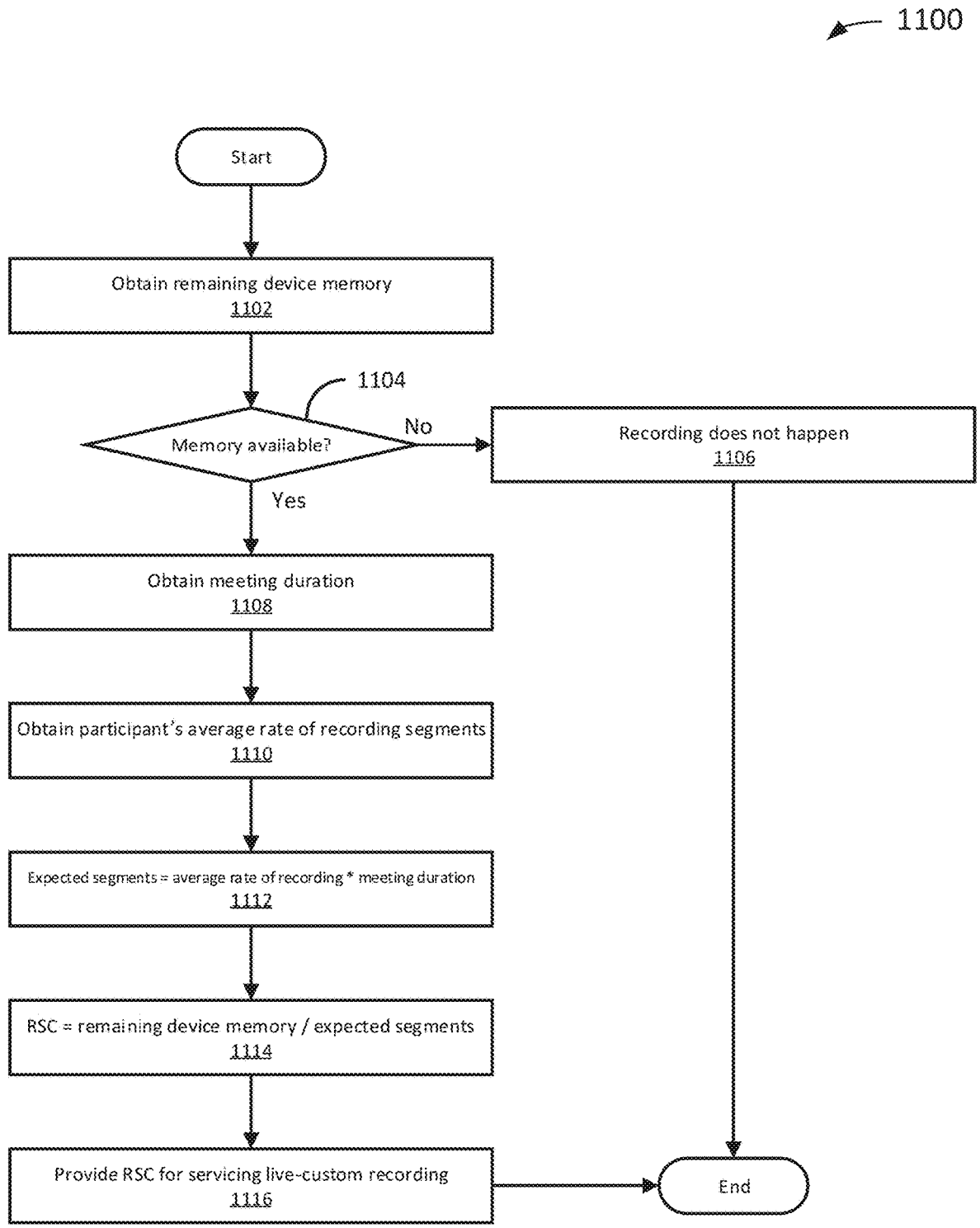
FIG. 11 depicts a flowchart of an example of a method of automated recording size constraint management, which includes calculating a recording size constraint.

FIG. 11 depicts a flowchart 1100 of an example of a method of automated recording size constraint management, which includes calculating a recording size constraint. The flowchart 1100 starts at module 1102 with obtaining remaining (or available) device memory. At decision point 1104, it is determined whether memory is available. If not (1104-No), the flowchart 1100 ends at module 1106 with the recording not happening. If so (1104-Yes), the flowchart 1100 continues to module 1108 with obtaining meeting duration and to module 1110 with obtaining a participant's average rate of recording segments (avg), e.g., as a first input. The average rate (avg) may be determined based on a participant's individual live-custom recording history (e.g. stored by the client-app engine for the participant or even at the server). As alternatives, the average rate (avg) may also be determined based on live-custom recording history of more than one participant when available, or based upon the subject matter or characteristics of an individual (e.g., grade level). The system also obtains a remaining duration of the meeting (d), e.g., as a second input.

The expected number of recording segments (e) to be recorded in the remaining duration by the participant at any given instant is calculated by multiplying the first and second inputs: e=avg×d. Pursuant to this formula, expected segments is set to the average rate of recording*meeting duration at module 1112.

A recording size constraint (rsc) is calculated by dividing remaining memory in a device (dm) by the expected number of recording segments (e): rsc=dm/e.

Pursuant to this formula, recording size constraint (RSC) is set to remaining device memory divided by expected segments at module 1114. The flowchart 1100 ends at module 1116 with providing recording size constraint (rsc) for servicing the live-custom recording. It may also be used for automatically managing recording quality as described herein.

As a meeting progresses, each time the recording happens, the duration of the meeting reduces (d) and the memory left in the device (dm) also reduces. If the device memory has reached nil, then the recording will not happen else the loop will continue to obtain inputs and calculate the recording size constraint. In one embodiment a portion of memory is always reserved so as to guarantee that transcription only format (text format) can always be provided for live-custom recording feature for the remaining duration of meeting (e.g., at a minimum or in the worst case when other recording formats cannot be supported).

There are multiple ways for calculating reserved memory size (rms). A trade-off between selecting the best method for calculating the reserved memory size is done at the implementation level considering factors such as performance, reliability and the memory size that it occupies. In a first method, the system obtains an expected size of recording (es) based on historical data, an expected number of recording segments (e) which was calculated earlier, and a bit rate needed for transcription (bt). The expected size of recording (es) may be determined based on individual live-custom recording history of a participant (e.g. stored by the client-app engine for the participant or even at the server). In another scenario the expected size of recording (es) may also be determined based on live-custom recording history of more than one participant when available. The product of these three inputs is the reserved memory size.

rms=es×e×bt

In a second method, a maximum recording window size (ws) as specified by an organizer or administrator is taken as the first input, while the second and third inputs are the same as the previous ones. The product of these inputs is the reserved memory size.

rms=ws×e×bt

In a third method, the reserved memory size is calculated by multiplying the remaining duration of the meeting (d) with the bit rate needed for transcription (bt).

rms=d×bt

In another embodiment, reserved memory size (rms) is utilized for calculating the recording size constraint (rsc). The system receives the memory left in the device (dm) and subtracts the reserved memory size (rms) from it, which results in permitted memory (pm).

pm=dm−rms

The permitted memory (pm) is divided by the expected number of recording segments (e) which gives the newly calculated recording size constraint (rsc) which is provided for servicing the live-custom recording.

rsc=pm/e

In another embodiment, a participant may be provided alerts/information (e.g. by, displaying on the user interface) on one or more of the following: (1) remaining device memory, (2) current recording size constraint (e.g. as determined by the automated recording size constraint management process), (3) recommendation on number of live-custom recordings (specified for each recording media quality or bit rate) a participant may make in the remaining meeting/teleconference duration. For example a recommendation on number of live-custom recordings may be determined as given below. Recommended number of recordings at a given recording media bit rate=Remaining device memory/(Maximum recording window size×Recording media bit rate). An automated recording quality management process determines a media type and associated bit rate for a live-custom recording that corresponds to maximizing recording quality without exceeding a given recording size constraint. This is useful in managing the memory used for recording in devices with limited memory. For example in a mobile client-device the memory available for recording may be limited. The total memory available for recording in a device may be specified as an input by the user of the device. In another scenario the operating system may place a limit on the total memory available for live-custom recording.

This process autonomously determines the quality of the recording segment based on the bit rate of the format and the total time length of a recording segment. The formats can be either Video-Audio, Audio-only or Transcription only. The total time length is obtained from the participant/user using the user interface. Using the above mentioned parameters, Recording Segment Size (RSS) is calculated as: RSS=Total Time Length of recording*Bit rate value of the format.

Where bit rate value for a format (either a video or audio format) are available and is considered inside each format block. The other prime input used in this process is Recording Size Constraint (RSC) which is calculated in an automated recording size constraint management process, an example of which was described above. This parameter is used to compare with calculated RSS measure and the final outcome is decided based on it. The outcome of this process is fed to a live-custom recording process where the actually recording of the segment happens.

Figure 12A:
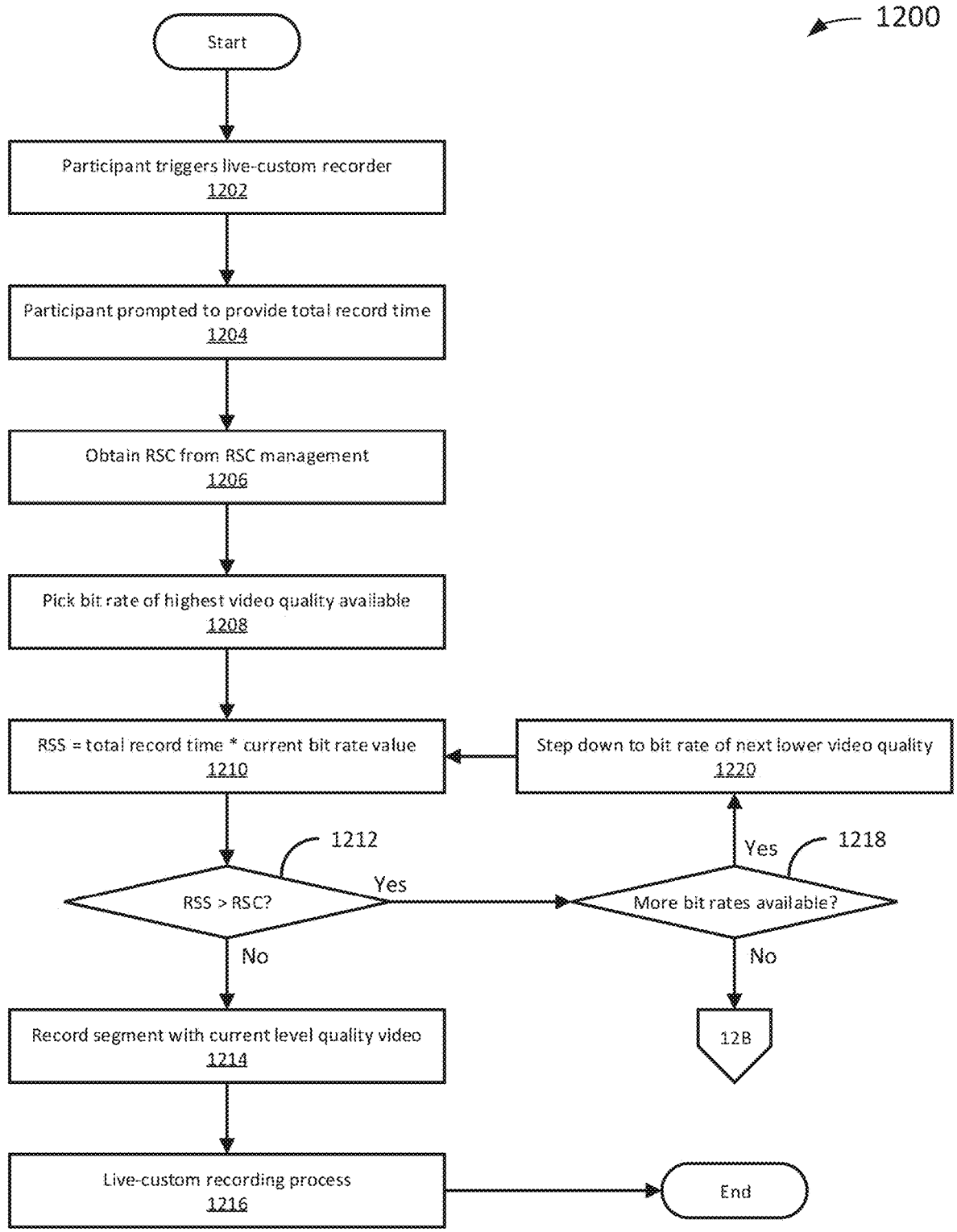
FIG. 12 depicts a flowchart of an example of a method of automated recording quality management.
Figure 12B:
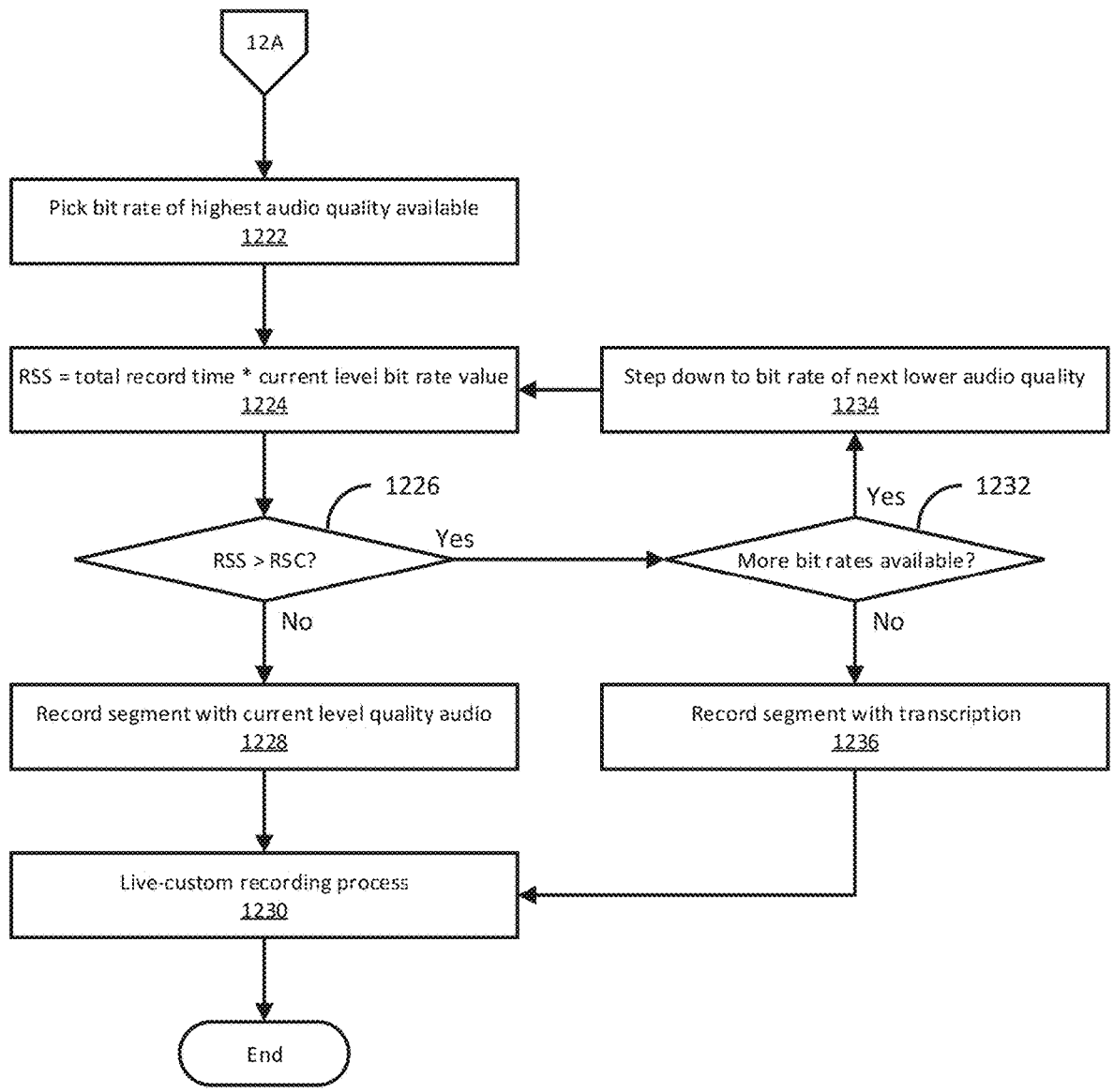

FIG. 12 depicts a flowchart 1200 of an example of a method of automated recording quality management. In each block, the process flow starts from picking up the highest bit rate value and is stepped down to the lowest bit rate (i.e., from multimedia format, to audio-only format, and finally to transcription-only format) and as per the Recording Size Constraint (RSS) value that was calculated, the quality of the recording is determined. The formula for calculating RSS is the total time length of recording multiplied with the quality format's available bit rate value. The step by step processes that happen inside the decision-making section are described as follows. In the first block, the computation for Video-Audio is processed.

The flowchart 1200 starts at module 1202 where a participant triggers a live-custom recorder. In a specific implementation, a participant presses a live-custom recording button to trigger the recording. The flowchart 1200 continues to module 1204 where the participant is prompted to provide total recording time. In a specific implementation, when triggered, a user interface is displayed requesting a participant input the total time length for recording a segment. (Normally, the total time length is the combination of past and future durations.) The flowchart 1200 then continues to module 1206 with obtaining Recording Size Constraint (RSC) which is calculated from an automated recording size constraint management process, an example of which was described previously. With the obtained inputs, a decision-making process is initiated to start with a bit rate of the highest video quality available at module 1208 and to decision point 1212 where it is determined whether RSS>RSC. RSS is calculated based on the total time length of the segment and the current level bit rate value. The computed measure is then compared with the RSC checking whether the Recording Size Constraint (RSC) can allow the current level quality. Video-Audio format. If not (1212-No), the flowchart 1200 continues to module 1214 with recording a segment with current level quality multimedia (video and audio) and ends at module 1216 with continuing the live-custom recording process. Thus, if RSS value can be supported within RSC, live-custom recording proceeds with the current level quality multimedia and the decision outcome is fed to the live-custom recording engine.

If so (1212-Yes), the flowchart 1200 continues to decision point 1218 where it is determined whether more multimedia (video and audio) bit rates are available. If so (1218-Yes), the flowchart 1200 steps down to bit rate of next lower video quality at module 1220, returns to module 1210, and continues as described previously. If not (1218-No), the flowchart 1200 continues to module 1222 with picking a bit rate of highest audio quality available. Thus, if the RSS value exceeds the RSC value, the process is stepped down to next lower video quality level. If there are any available lower video quality level bit rates, then it is again looped back to compute the new RSS value using that current video quality bit rate value. If there is no availability of any video quality bit rate value, then the process is moved to the next block where Audio-only quality bit rates are used.

In the second block, the computation for Audio-only is processed. The flowchart 1200 continues to module 1224 where RSS is set to total record time*current level bit rate value. In this way, the first process inside this block is picking up the bit rate of the highest audio quality available; then RSS is calculated based on the total time length of the segment and the current level bit rate value. The flowchart 1200 continues to decision point 1226 where it is determined whether RSS>RSC. If not (1226-No), the flowchart 1200 continues to module 1228 with recording a segment with current level quality audio and ends at module 1230 with continuing the live-custom recording process. Thus, the computed measure is compared with the RSC checking whether the Recording Size Constraint (RSC) can allow the current level quality for, e.g., audio-only format. If RSS value can be supported within RSC, then the outcome of this process is recording the segment with current level quality and the decision outcome is fed to the live-custom recording engine. If so, (1226-Yes), then the flowchart 1200 continues to decision point 1232 where it is determined whether more bit rates are available. If so (1232-Yes), the flowchart 1200 continues to module 1234 with stepping down to bit rate of next lower audio quality and returns to module 1224 as described previously. Thus, if the RSS value exceeds the RSC value, then the process is stepped down to next lower audio quality level and if there are any available lower audio quality level bit rates, then it is again looped back to compute the new RSS value using that current audio quality bit rate value. If not (1232-No), then the flowchart continues to module 1236 with recording a segment with transcription and then returns to module 1230 as described previously. Thus, if there is no availability of any audio quality bit rate value, then the process is moved to the next block where, e.g., transcription-only quality bit rates are used.

In the third block, recording for transcription-only format happens with the remaining RSC. As there are no other lower recording format quality, the system may use the remaining RSC in recording the segment with transcription-only format. Finally, the outcome of recording the segment with transcription-only format is fed to the Live-Custom Recording Process. In another embodiment, enough memory may always be reserved so that transcription-only (text only) format may always be provided in the worst case or at a minimum.

Outcomes of each block are directly fed to the live-custom recording process block where the recording of the segment is initiated. In one embodiment, if there is a fluctuation in connectivity bandwidth while live-custom recording then, switching between the media format (Video-Audio<->Audio-only<->Transcription-only) is automated according to the bandwidth that is used. In another scenario, the user/participant is also given an option to switch between media format types as needed from Video-Audio<->Audio-only<->Transcription-only to meet memory constraints.

Figure 13:
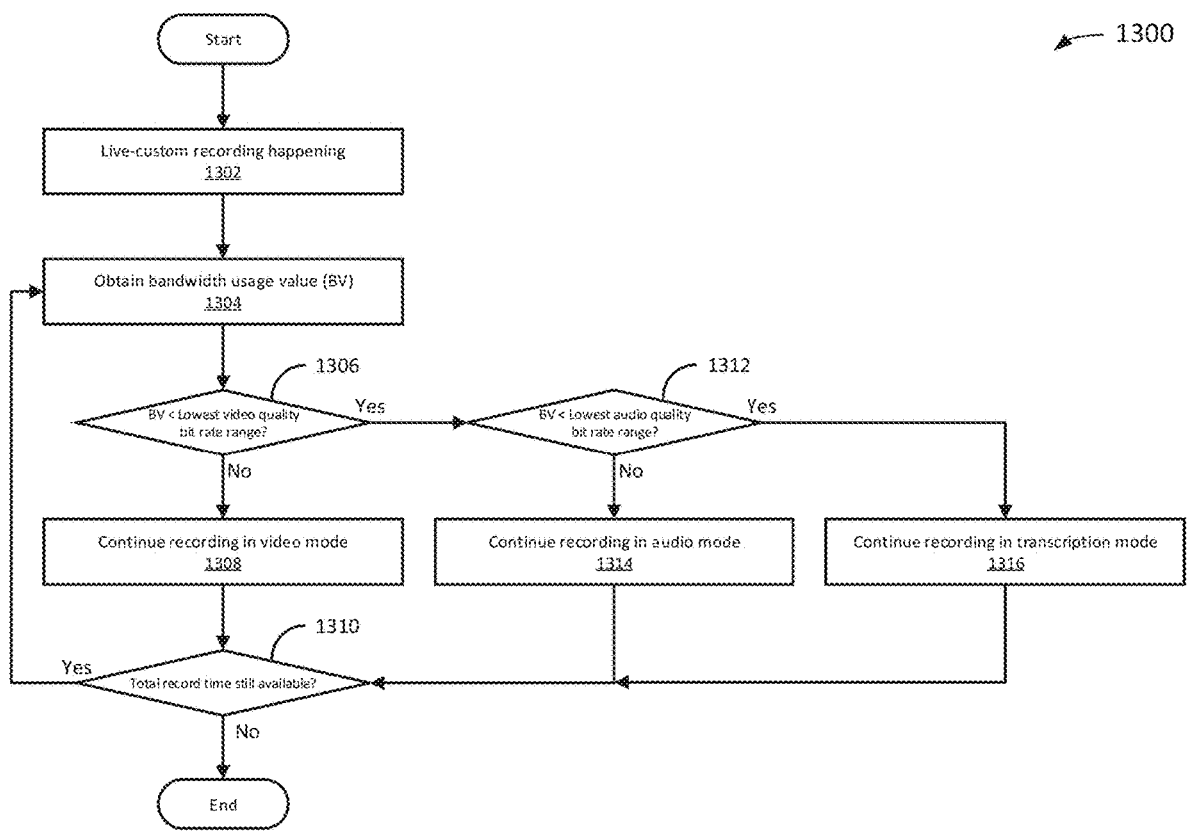
FIG. 13 illustrates a flow chart of an example of a method for automated single segment recording media type management using bandwidth.

FIG. 13 illustrates a flowchart 1300 of an example of a method for automated single segment recording media type management using bandwidth. This embodiment describes automating and managing the media types using channel's bandwidth when recording for a single segment is processed. This process of automating the recording media type happens when live-custom recording takes place, as is illustrated by the flowchart 1300 starting at module 1302 with live-custom recording happening. When a single segment is recorded, the system can switch the media type automatically between Video-Audio<->Audio-only<->Transcription-only according to the bandwidth of the user's/participant's device. This is useful in managing the recordings in devices when there is a fluctuation in connectivity bandwidth. Finally, when the recording is completed, all the media files are linked in a single segment and is processed to be saved. The link that is used to record a segment should allow other media formats as well. In one embodiment, automated single segment recording media type management using bandwidth is used along with automated recording quality management process.

The process autonomously switches between the recording media types when there is a fluctuation in connectivity bandwidth during the segment is recorded using live-custom recording. In this example, the formats include multimedia, audio, or transcription. The bit rate value for a format (either a video or audio format) will be available in the system. The only parameter that should be obtained is the usage of the bandwidth by the devices. After obtaining the bandwidth usage, the flow process will enter into the decision-making section where the action of switching between the media type for recording is determined. The step by step processes that happen inside the decision-making section are described as follows:

The flowchart 1300 continues to module 1304 with obtaining a bandwidth usage value (BV) and to decision point 1306 where it is determined whether BV lowest video quality bit rate range. If not (1306-No), the flowchart continues recording in video mode at module 1308 and then continues to decision point 1310 where it is determined whether total record time is still available. If not (1310-No), the flowchart 1300 ends. If so (1310-Yes), the flowchart 1300 returns to module 1304 as described previously. For example, if the bandwidth value is greater than or equal to the lowest multimedia quality bit rate, then that particular time instance segment is recorded in multimedia bit rate mode. If the bandwidth value is lower than the lowest multimedia quality bit rate, then the process is stepped down to check with the next lower media type (audio).

If so (1306-Yes), then the flowchart 1300 continues to decision point 1312 where it is determined whether BV<lowest audio quality bit rate range. If not (1312-No), the flowchart 1300 continues to module 1314 with continuing recording in audio mode and returns to decision point 1310 as described previously. Thus, the bandwidth value that was obtained is then compared with the lowest audio quality bit rate value. For example, if the bandwidth value is greater than or equal to the lowest audio quality bit rate, then that particular time instance segment is recorded in audio bit rate mode. If the bandwidth value is lower than the lowest audio quality bit rate, then the process is again stepped down to the next lower media type (transcription format) and the flow is directly processed to recording the segment in transcription bit rate mode. If so (1312-Yes), the flowchart continues to module 1316 to continue recording in transcription mode then returns to decision point 1310 as described previously.

After the decision-making of recording media type is determined, the system will check if the total time of recording has reached its time limit. If the total time of recording is still available to record, then it is looped back to the first stage of obtaining the bandwidth and checking with the media bit rate. This loop continues until the single segment recording reaches its time limit and completes recording the segment. If the total time of recording has reached its limit, then the system will stop the live-custom recording process In another embodiment, enough memory may always be reserved so that transcription (text only) format may always be provided in the worst case or at a minimum.

Live-custom recording on the server-side may be offered as a premium service because of the server resources needed and it provides many benefits such as: (1) quality recordings especially when the bandwidth/connection quality with the client device is poor (2) fewer or no storage size constraints (3) instantaneous or low-latency playback possible of live-custom recording for all/chosen participants.

Live-custom recording on the client-side has many benefits such as: (1) encryption of content passing through server is possible for privacy (2) immediate access of the Live-custom recording to a user associated with the client device (3) less burden on the server when users/participants scale/increase.

In one scenario if the client side is experiencing poor bandwidth connection or a low quality connection then the system automatically triggers a change of the live-custom recording from the client-side to the server side. A client device may provide feedback on its bandwidth/connection quality to the client live-custom recording engine periodically and especially when it falls below a pre determined threshold (For example transcribe bit rate). When the bandwidth/connection quality is below the threshold the client live-custom recording engine sends an activation message to activate the server live-custom recording engine which in response starts maintaining a sliding window of history for the client. Thereafter any existing or future live-customer recording trigger/request is directed to the live-custom recording engine at the server from the client live-custom recording engine. The client live-custom recording engine sends a deactivation message to deactivate the server live-custom recording engine when its bandwidth/connection quality rises above the pre-determined threshold. The server may also monitor its connection quality with the client and if it falls below a pre-determined threshold the server may perform live-custom recording automatically when it receives a live-custom recording request from the user.

In another scenario when the bandwidth/connection quality is known to be poor ahead of time (e.g. low quality internet service level subscription) the client Live-custom recording engine will activate the server Live-custom recording engine.

What is claimed is:

1. A system comprising one or more processors and memory storing instructions that, when executed by the one or more processors, cause the system to perform:
    obtaining an indication of a past duration preference to record a live-custom recording segment or clip during a teleconference from a recording request with a timestamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant; and tagging the live-custom recording, wherein the tag is received during the teleconference from a client device prior to the providing the link to the recording to the teleconference participant;

wherein the timestamp is a time a live-custom recorder button was clicked by the teleconference participant to capture a segment or clip of the teleconference.

2. The system of claim 1, comprising instructions that, when executed by the one or more processors, cause the system to perform:

receiving, at the recorder engine, a notification to start a sliding window history;

requesting media packets from a conference management engine; and receiving media packets from the conference management engine at the recorder engine.

3. The system of claim 1, wherein the teleconference participant is a first teleconference participant of a plurality of teleconference participants, comprising instructions that, when executed by the one or more processors, cause the system to perform:

receiving permission from the first teleconference participant to share the live-custom recording segment or clip with a second teleconference participant of the plurality of teleconference participants;

providing a link to the live-custom recording segment or clip to the second teleconference participant;

providing access to the live-custom recording segment or clip to the second teleconference participant.

4. The system of claim 1, wherein the teleconference participant is a first teleconference participant of a plurality of teleconference participants that includes a second teleconference participant, comprising instructions that, when executed by the one or more processors, cause the system to perform storing the first teleconference participant's recording segment or clip in a higher quality format than that of the second teleconference participant's recording segment or clip.

5. The system of claim 1, wherein the computing the start time, the initiating the live-custom recording, and the request to stop recording are performed on a client device.

6. The system of claim 1, wherein the computing the start time, the initiating the recording, and the stopping the live-custom recording are performed server-side by the recorder engine.

7. The system of claim 1, comprising instructions that, when executed by the one or more processors, cause the system to perform detecting inadequate or poor link quality at a client device, wherein the recording is initiated server-side by the recorder engine upon detection of inadequate or poor link quality at the client device.

8. The system of claim 3, comprising instructions that, when executed by the one or more processors, cause the system to perform:

providing the link to the live-custom recording segment or clip with a unique identifier, wherein the unique identifier includes a participant identifier and a recording sequence number, wherein the participant identifier is associated with the first teleconference participant, and wherein the recording sequence number is associated with a chronological order of recording requests;

providing access to the live-custom recording segment or clip to the second teleconference participant from an end-user device or from the server side.

9. The system of claim 1, wherein a time-stamp or sequence number is associated with the live-custom recording segment or clip.

10. The system of claim 1, comprising instructions that, when executed by the one or more processors, cause the system to perform computing, at the recorder engine, the start time by subtracting the past duration from a value associated with the past duration preference.

11. A method comprising:

obtaining an indication of a past duration preference to record a live-custom recording segment or clip during a teleconference from a recording request with a timestamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant; and tagging the live-custom recording, wherein the tag is received during the teleconference from a client device prior to the providing the link to the recording to the teleconference participant;

wherein the timestamp is a time a live-custom recorder button was clicked by the teleconference participant to capture a segment or clip of the teleconference.

12. The method of claim 11, comprising:

receiving, at the recorder engine, a notification to start a sliding window history;

requesting media packets from a conference management engine; and receiving media packets from the conference management engine at the recorder engine.

13. The method of claim 11, wherein the teleconference participant is a first teleconference participant of a plurality of teleconference participants, comprising:

receiving permission from the first teleconference participant to share the live-custom recording segment or clip with a second teleconference participant of the plurality of teleconference participants;

providing a link to the live-custom recording segment or clip to the second teleconference participant;

providing access to the live-custom recording segment or clip to the second teleconference participant.

14. The method of claim 11, wherein the teleconference participant is a first teleconference participant of a plurality of teleconference participants that includes a second teleconference participant, comprising storing the first teleconference participant's recording segment or clip in a higher quality format than that of the second teleconference participant's recording segment or clip.

15. The method of claim 11, wherein the computing the start time, the initiating the live-custom recording, and the request to stop recording are performed on a client device.

16. The method of claim 11, wherein the computing the start time, the initiating the recording, and the stopping the recording are performed server-side by the recorder engine.

17. The method of claim 11, comprising detecting inadequate or poor link quality at a client device, wherein the recording is initiated server-side by the recorder engine upon detection of inadequate or poor link quality at the client device.

18. The method of claim 13, comprising:
providing the link to the live-custom recording segment or clip with a unique identifier, wherein the unique identifier includes a participant identifier and a recording sequence number, wherein the participant identifier is associated with the first teleconference participant, and wherein the recording sequence number is associated with a chronological order of recording requests;

providing access to the live-custom recording segment or clip to the second teleconference participant from an end-user device or from the server side.

19. The method of claim 11, wherein a time-stamp or sequence number is associated with the live-custom recording segment or clip.

20. The method of claim 11, comprising computing, at the recorder engine, the start time by subtracting the past duration from a value associated with the past duration preference.

21. A system comprising one or more processors and memory storing instructions that, when executed by the one or more processors, cause the system to perform:
obtaining an indication of a past duration preference to record a live-custom recording segment or clip during a teleconference from a recording request with a time-stamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant; and tagging the live-action recording, wherein the tag is received during the teleconference from a client device prior to the providing the link to the recording to the teleconference participant.

22. The system of claim 21, wherein the timestamp is a time a live-custom recorder button was clicked by the teleconference participant to capture a segment or clip of the teleconference.

23. A method comprising:
obtaining an indication of a past duration preference to record a live-custom recording segment or clip during a teleconference from a recording request with a time-stamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant; and tagging the recording, wherein the tag is received during the teleconference from a client device prior to the providing the link to the recording to the teleconference participant.

24. The method of claim 23, wherein the timestamp is a time a live-custom recorder button was clicked by the teleconference participant to capture a segment or clip of the teleconference.

25. A system comprising one or more processors and memory storing instructions that, when executed by the one or more processors, cause the system to perform:
obtaining an indication of a past duration preference to record a live-custom recording segment or clip during a teleconference from a recording request with a time-stamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant;

wherein the teleconference participant is a first teleconference participant of a plurality of teleconference participants, comprising instructions that, when executed by the one or more processors, cause the system to perform:

receiving permission from the first teleconference participant to share the live-custom recording segment or clip with a second teleconference participant of the plurality of teleconference participants;

providing a link to the live-custom recording segment or clip to the second teleconference participant;

providing access to the live-custom recording segment or clip to the second teleconference participant;

providing the link to the live-custom recording segment or clip with a unique identifier, wherein the unique identifier includes a participant identifier and recording sequence number, wherein the participant identifier is associated with the first teleconference participant, and wherein the recording sequence number is associated with a chronological order of recording requests; and providing access to the live-custom recording segment or clip to the second teleconference participant from an end-user device or from the server side.

26. A method comprising:

obtaining an indication of a past duration preference to record a live-custom recording segment or clip during a teleconference from a recording request with a timestamp received from a teleconference participant, wherein the past duration preference is chosen by the teleconference participant;

determining a past duration from the indication of the past duration preference;

computing, at a recorder engine, a start time based on the past duration measured from the timestamp;

initiating the recording from the start time;

providing an option to the teleconference participant to indicate a future duration for recording and including at least a portion of the recording in a live-custom recording segment or clip;

stopping the recording upon receipt of a request to stop recording;

providing a link to the live-custom recording segment or clip to the teleconference participant;

providing access to the live-custom recording segment or clip to the teleconference participant;

wherein the teleconference participant is a first teleconference participant of a plurality of teleconference participants, comprising:

receiving permission from the first teleconference participant to share the live-custom recording segment or clip with a second teleconference participant of the plurality of teleconference participants;

providing a link to the live-custom recording segment or clip to the second teleconference participant;

providing access to the live-custom recording segment or clip to the second teleconference participant;

providing the link to the live-custom recording segment or clip with a unique identifier, wherein the unique identifier includes a participant identifier and a recording sequence number, wherein the participant identifier is associated with the first teleconference participant, and wherein the recording sequence number is associated with a chronological order of recording requests; and providing access to the live-custom recording segment or clip to the second teleconference participant from an end-user device or from the server side.

* * * * *